G. J. HEBBELER.
VEHICLE.
APPLICATION FILED APR. 17, 1916.

1,215,528.

Patented Feb. 13, 1917.

Witnesses:
F. E. Arthur,
W. Thornton Bogert

Inventor
George J. Hebbeler
By Walter J. Murray
Attorney

UNITED STATES PATENT OFFICE.

GEORGE J. HEBBELER, OF CINCINNATI, OHIO.

VEHICLE.

1,215,528.  Specification of Letters Patent.  Patented Feb. 13, 1917.

Application filed April 17, 1916. Serial No. 91,575.

*To all whom it may concern:*

Be it known that I, GEORGE J. HEBBELER, a citizen of the United States of America, and resident of Cincinnati, in the county of Hamilton and State of Ohio, have invented a new and useful Improvement in Vehicles, of which the following is a specification.

An object of my invention is a vehicle having both axles rotatively mounted with relation to the chassis, and operating upon fifth wheels of novel construction.

A further object is a vehicle in which the axles are rotatively mounted and operate upon fifth wheels which are connected to operate in opposite directions and which are provided with means for preventing the vehicle upsetting.

These and other objects are attained in the construction described in the following specification and illustarted in the accompanying drawings, in which.

Figure 3:
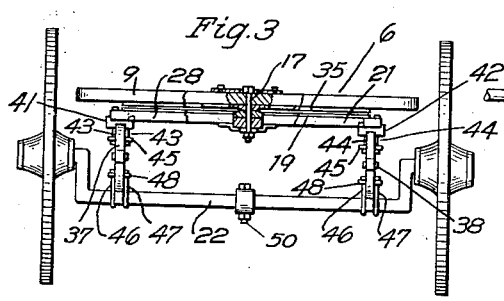
Fig. 3 is an end view of a vehicle embodying my invention.
Figure 5:
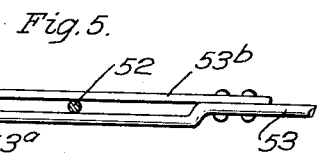
Fig. 5 is a fragmental sectional view taken on the line 5—5 of Fig. 1.

My improved vehicle construction consists of a vehicle chassis 6 composed of side rails 7 and 8 connected at the rear of the chassis by a bolster 9 and at intervals by means of cross rails 10, 11, 12, 13 and 14, the rails 10 and 11 being located adjacent to one another at the rear of the chassis and the rails 12 and 13 being located adjacent to one another at the front of the chassis. Between rails 10 and 11 and connected with the side rails 7 and 8 at points midway between the cross rails 10 and 11 is another cross rail 15, the same construction being employed at the oposite end of the chassis, where a cross rail 16 is located between the cross rails 12 and 13. These rails 15 and 16 are provided to receive the respective king bolts 17 and 18 upon which the fifth wheels of the vehicle construction are rotatively mounted. Secured to the side and cross rails at the respective rear and front ends of the chassis, are circular iron members 19 and 20 located concentrically with the respective king bolts 17 and 18. King bolt 17 rotatively mounts a platform 21 upon which the rear axle 22 is mounted, and king bolt 18 mounts a platform 23 upon which the front axle 24 is mounted. Platform 21 consists of side bars 25 and 26 connected at their ends by front and rear cross bars 27 and 28. Platform 23 consists of similar side members 29 and 30 connected by front and rear cross bars 31 and 32. Located in alinement with the side rails 7 and 8 of the chassis, are bars 33 and 34 which extend between cross bars 27 and 28 of the platform 21 and between the cross bars 31 and 32 of the platform 23. These bars 34 and 33 are operatively connected with the king bolts 17 and 18 so that the platforms may have rotary motion with relation to the chassis. However, in order to increase the bearing surface thereof upon the lower members 19 and 20 of the fifth wheels, I have attached to the respective platforms 21 and 23 upper members 35 and 36 of the fifth wheels, the members 35 and 36 being located concentrically with the respective king bolts 17 and 18 and of the same size as lower members 19 and 20 of the fifth wheels, so that the two members of each fifth wheel may operate over one another. Both fifth wheels are of a size such that they extend from one side rail to the opposite side rail of the chassis and from one side bar to the opposite side bar of each platform. This brings the point of bearing of each platform upon the chassis at its edge, thus rendering the vehicle much more stable than if the fifth wheels were constructed in the usual manner, with a diameter such that they extend but a comparatively short distance to each side of the king bolt and therefore fail to support the entire width of the vehicle chassis and the platforms. To the under surfaces of the side bars 25, 26, 29 and 30 of the respective platforms 21 and 23, are connected the usual elliptic springs 37, 38, 39 and 40, the springs being attached to the respective platforms by means of plates 41 and 42, which are provided with upper and lower grooves adapted to receive the side rails of the respective platforms and the upper halves of the elliptic springs, as shown in Fig. 3. In order to secure the springs in positions in the grooves of the plates, shackles consisting of bolts 43 and 44 and plates 45, are provided. The grooves in the plates 41 and 42 prevent movement of the springs relatively to the side bars of each platform. The axles are connected with the lower halves of the springs by means of shackles 46 consisting of bolts 47 and plates 48. In Fig. 3 I have shown the axles as being of the dropped type so as to render the vehicle more stable thus aiding the novel fifth wheel construction embodying a detail of my invention, in supporting the vehicle and preventing its turning over when rounding curves or when occupying an inclined position. Attached to points midway between the ends of the axles I have provided a longitudinally extending tie rod 49 which is pivotally connected therewith by means of bolts 50 and 51. This rod prevents the axles moving backward or forward with relation to one another and to the vehicle platforms and chassis.

Figure 1:
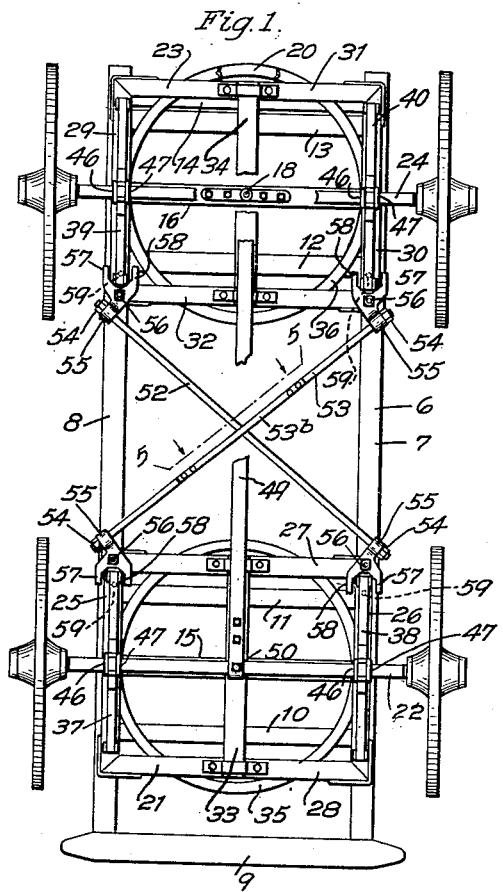
Figure 1 is an inverted plan view of a vehicle running gear and chassis embodying my invention.
Figure 2:
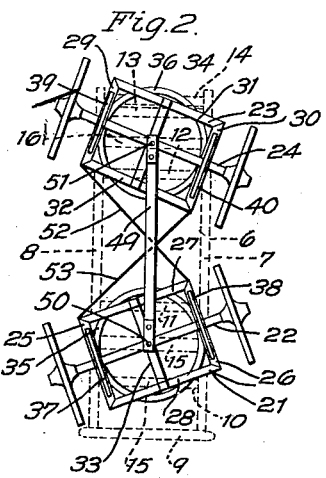
Fig. 2 is a diagrammatic inverted plan view upon a reduced scale, of the vehicle construction disclosed in Fig. 1, the parts being shown in different positions.
Figure 4:
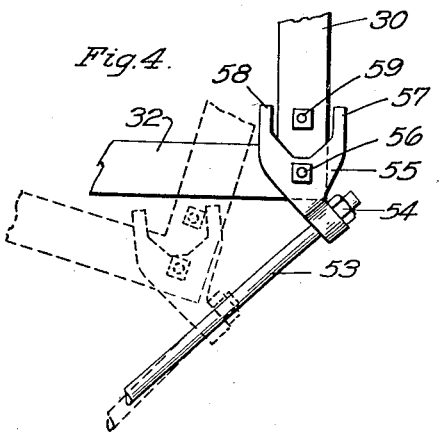
Fig. 4 is a view upon an enlarged scale, of a motion limiting stop embodying a detail of my invention.

In order to operatively connect the platforms 21 and 23 I have provided two rods 52 and 53 connecting diagonally opposite inner corners of the platforms so that the rods cross one another centrally of the chassis, as shown in Figs. 1 and 2. The rod 52 is preferably a straight rod provided at its ends with adjustment nuts 54 passing through openings in irons 55 located at diagonally opposite inner corners of the platforms 21 and 23 and pivotally mounted thereon by means of bolts 56 secured to the corners of the platforms. Each iron 55 is provided with a fork consisting of fingers 57 and 58 extending on opposite sides of a pin 59 secured to the side members of the respective platforms 21 and 23. When the platforms are rotated on their pivot pins 17 and 18 to the positions shown in Fig. 2 the tie rods 52 and 53 will be rotated on their pivot pins 56 to bring each of the stops to positions in which one or the other of the fingers 57 or 58 is in engagement with the stop pin 59, as shown in dotted lines in Fig. 4, thereby preventing further movement of the platforms with relation to the chassis. The forks 55 operate simultaneously and bring their fingers into engagement with the pins 59 so as to prevent further angular movement to the platforms. In this manner four stops are operated simultaneously to prevent excessive rotation of the platforms in either direction. In addition to these four stops I have provided the rod 53 with an offset portion 53ª located centrally thereof at the point where the rod 52 crosses it. In order to hold the two rods together at this point I have provided a plate 53ᵇ secured to the rod and bridging the offset portion 53ª so as to provide a way in which the rod 52 may reciprocate from one side to the opposite side of the offset portion, the ends of the offset operating as stops to prevent further sidewise movement of the rod 52 in the way when the platforms are turned to their extreme angular positions.

In my improved vehicle construction it will thus be seen that I have provided a means embodied in the enlarged fifth wheels for preventing the vehicle upsetting upon turning corners or when the vehicle is occupying a position on an incline such as when passing vehicles and when turning from the crown of the road. In addition to this I have eliminated the danger of the vehicle turning over when the load it is carrying is shifted from the center to either side of the vehicle. The point of bearing of each fifth wheel is directly upon the point of bearing of the spring upon the axle instead of having the point of bearing located at points a short distance from the king bolt as in ordinary vehicle fifth wheel construction. The small fifth wheels of ordinary construction cause the vehicle body to tip and therefore bring the center of gravity of the load carried by the vehicle to a position beyond the point of contact of the wheel with the surface on the lower side of the road so that the resultant center of gravity of the combined vehicle and the load lies at a point closely adjacent to or beyond the bearing of the wheel on the lower side of the road thereby rendering the vehicle unstable. In addition to this feature of construction I have provided the series of stops for preventing movement of the platforms to too great an angle with relation to the chassis, thereby avoiding the danger of upsetting because of the points of contact of the wheels with the road, being moved away from the side of the vehicle, thereby reducing the tread and changing the position of the center of gravity of the vehicle. The stops are so constructed that the road wheels cannot be turned to positions in which their points of contact with the road lies within the outer edges of the vehicle body. The novel construction of the stops, together with their multiplicity and simultaneity of operation to prevent excessive movement of the platforms, is also a novel feature of construction over constructions heretofore employed. My improved vehicle is particularly designed to be used as a trailer to be attached to an automobile truck or other propelling vehicle by means of any suitable construction such as the couplers ordinarily used for such purposes. However, the vehicle may be as readily adapted to use as a unit in itself, it being constructed to readily be propelled by any suitable motive power. In using the vehicle when propelled by horses, an ordinary wagon tongue may be secured to either one of the platforms.

In my improved vehicle construction it will be seen that the fifth wheels and the stops connected with the tie rods coöperate simultaneously to prevent instability of the vehicle, the stops on the tie rods preventing the wheels engaging the edges of the side rails 7 and 8. This prevents the riding of the side rails onto the wheels and thus having a tendency to tip the chassis as is frequently done in ordinary vehicle construction.

Having thus described my invention, what I claim is;

1. A vehicle comprising a chassis, platforms pivotally mounted on the chassis, tie rods connecting the diagonally opposite adjacent corners of the platforms, and stops mounted on the platforms and the tie rods adjacent to the points of connection of the tie rods with the platforms, adapted to limit the rotation of the platforms.

2. In combination in a vehicle, a chassis, platforms pivotally mounted on the chassis, tie rods connecting diagonally opposite adjacent corners of the platforms, stops located at the ends of the tie rods and adapted to coöperate with the platforms to limit the movement thereof with relation to the chassis, and additional stops located at points intermediate the ends of the rods, adapted to coöperate with the first mentioned stops in limiting the motion of the platforms.

3. In a vehicle the combination of a chassis, a platform rotatively mounted at each end of the chassis and having a width substantially equal to that of the chassis, a fifth wheel located between each platform and the chassis and having a diameter substantially equal to the width of the chassis and the platforms, an axle and road wheels for each platform, springs located between each axle and each platform and secured thereto at points vertically beneath the outer points of contact of each fifth wheel with the platform, tie rods connecting diagonally opposite inner corners of the platform, and stops mounted on the platforms and the tie rods adjacent to the points of connection of the tie rods with the platforms, adapted to limit the rotation of the platforms.

4. In combination in a vehicle, a chassis, platforms pivotally mounted on the chassis, tie rods connecting diagonally opposite adjacent corners of the platforms, stops located at the ends of the tie rods and adapted to coöperate with the platforms to limit the movement thereof with relation to the chassis, each of said stops consisting of a fork rotatively mounted on each inner corner of each platform and connected with each end of said rods, and a pin secured to the platforms between the branches of each fork, adapted to be engaged by first one branch and then the other branch when the rods and platforms are moved.

5. A vehicle comprising a chassis, platforms mounted on the chassis, tie rods connecting diagonally opposite adjacent corners of the platforms, stops located at the ends of the tie rods and adapted to coöperate with the platforms to limit the movement thereof with relation to the chassis, each of the stops consisting of a fork rotatively mounted on each inner corner of each platform and connected with each end of said rods, and a pin secured to the platforms between the branches of each fork, adapted to be engaged by first one branch and then the other branch when the rods and platforms are moved, and additional stops located at points intermediate the ends of the rods, adapted to coöperate with the first mentioned stops in limiting the motion of the platforms.

In testimony whereof, I have hereunto subscribed my name this 14th day of April, 1916.

GEORGE J. HEBBELER.

Witnesses:
WALTER F. MURRAY,
W. THORNTON BOGERT.

Copies of this patent may be obtained for five cents each, by addressing the "Commissioner of Patents, Washington, D. C."